(12) United States Patent
Shih et al.

(10) Patent No.: US 11,828,379 B2
(45) Date of Patent: Nov. 28, 2023

(54) LOW-PROFILE VALVE, PIPELINE AND IMMERSION COOLING SYSTEM

(71) Applicant: Fulian Precision Electronics (Tianjin) Co., LTD., Tianjin (CN)

(72) Inventors: Tung-Ho Shih, New Taipei (TW); Yao-Chih Liu, New Taipei (TW); Chia-Nan Pai, New Taipei (TW); Tsung-Lin Liu, Neihu (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/940,152

(22) Filed: Sep. 8, 2022

(65) Prior Publication Data

US 2023/0076046 A1  Mar. 9, 2023

(30) Foreign Application Priority Data

Sep. 9, 2021 (CN) .......................... 202111056552.0

(51) Int. Cl.
| | | |
|---|---|---|
| F16K 13/02 | (2006.01) | |
| F16K 3/16 | (2006.01) | |
| F16K 3/314 | (2006.01) | |
| F16K 31/00 | (2006.01) | |
| F16K 31/52 | (2006.01) | |
| F16K 31/528 | (2006.01) | |
| F16K 13/00 | (2006.01) | |

(52) U.S. Cl.
CPC ................ *F16K 3/16* (2013.01); *F16K 3/314* (2013.01); *F16K 13/00* (2013.01); *F16K 13/02* (2013.01); *F16K 31/003* (2013.01); *F16K 31/52* (2013.01); *F16K 31/528* (2013.01)

(58) Field of Classification Search
CPC . F16K 3/16; F16K 3/314; F16K 13/00; F16K 13/02; F16K 31/003; F16K 31/52; F16K 31/528
USPC ...................... 251/66–74, 107, 109
See application file for complete search history.

(56) References Cited

U.S. PATENT DOCUMENTS

| | | | |
|---|---|---|---|
| 3,095,901 A * | 7/1963 | Larson .................. | F16K 17/042 280/736 |
| 4,659,063 A * | 4/1987 | Veillette ................ | D06F 39/081 251/74 |
| 7,163,186 B2 * | 1/2007 | Opper ..................... | F16K 31/56 251/236 |

* cited by examiner

*Primary Examiner* — John Bastianelli
(74) *Attorney, Agent, or Firm* — ScienBiziP, P.C.

(57) ABSTRACT

A low-profile and small-size valve to a shut off a flow of fluid in a pipeline includes a frame, a tube, a moving part, a lever, an elastic part, a latch, and a trigger. The tube is movable with the moving part. The lever is rotatable around an axis. The elastic part can push the lever to rotate after the trigger pushes the buckle away from the lever to unlatch the lever and allow rotation. During the rotation of the lever, the lever pulls on the moving part, and the moving part pulls on the tube together to disconnect the tube from the pipe. The valve improves the convenience and efficiency of shutting off a flow of fluid. A pipeline and an immersion cooling system is also disclosed.

20 Claims, 4 Drawing Sheets

LOW-PROFILE VALVE, PIPELINE AND IMMERSION COOLING SYSTEM

FIELD

The subject matter herein generally relates to water flow shut off mechanism, and to valve, pipeline and immersion cooling system.

BACKGROUND

In pipeline or immersion cooling system design, valve is used to shut off water flow. Generally there are two ways to close the water flow, one is manual valve by manually turning the valve to shut off the flow. However, such valve cannot be operated remotely. The other is to use a solenoid valve, such valve can be externally large, prominent, and vulnerable.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
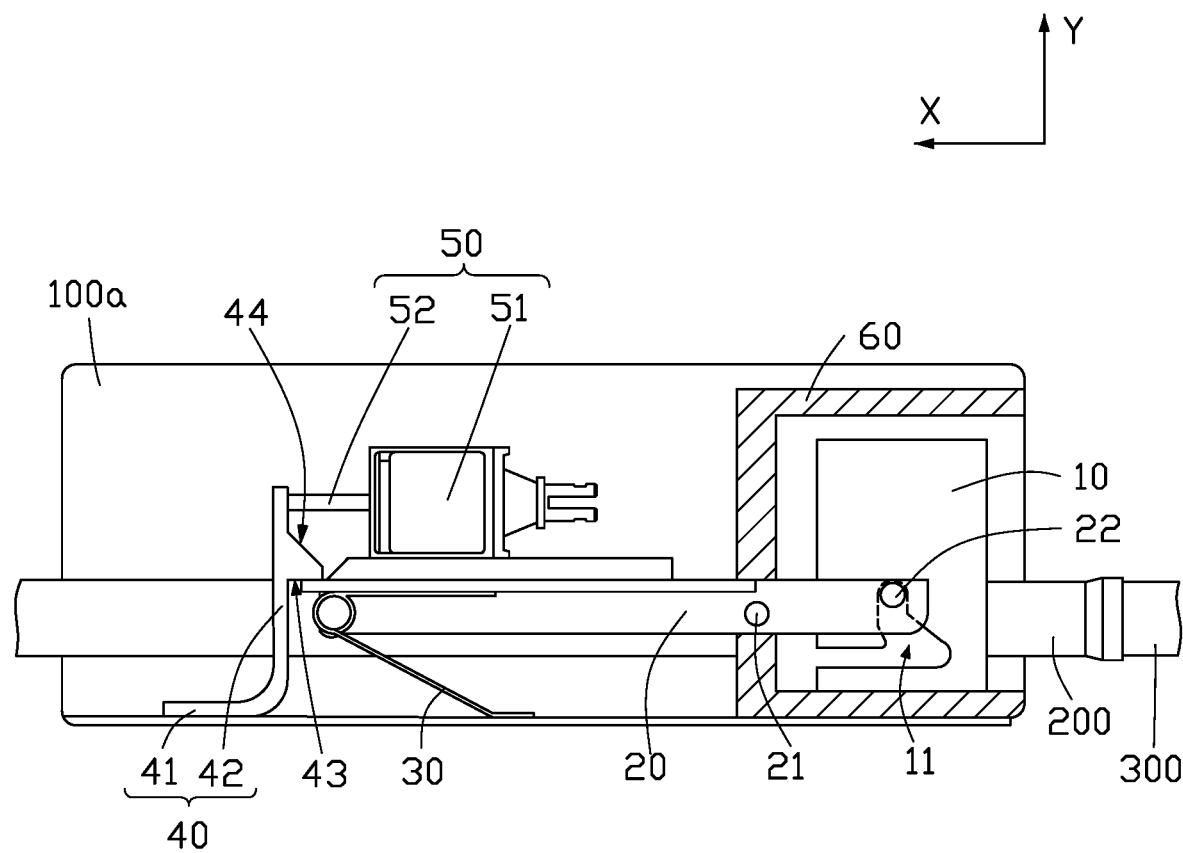
FIG. 1 is a sectional view of a valve when the valve is open according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
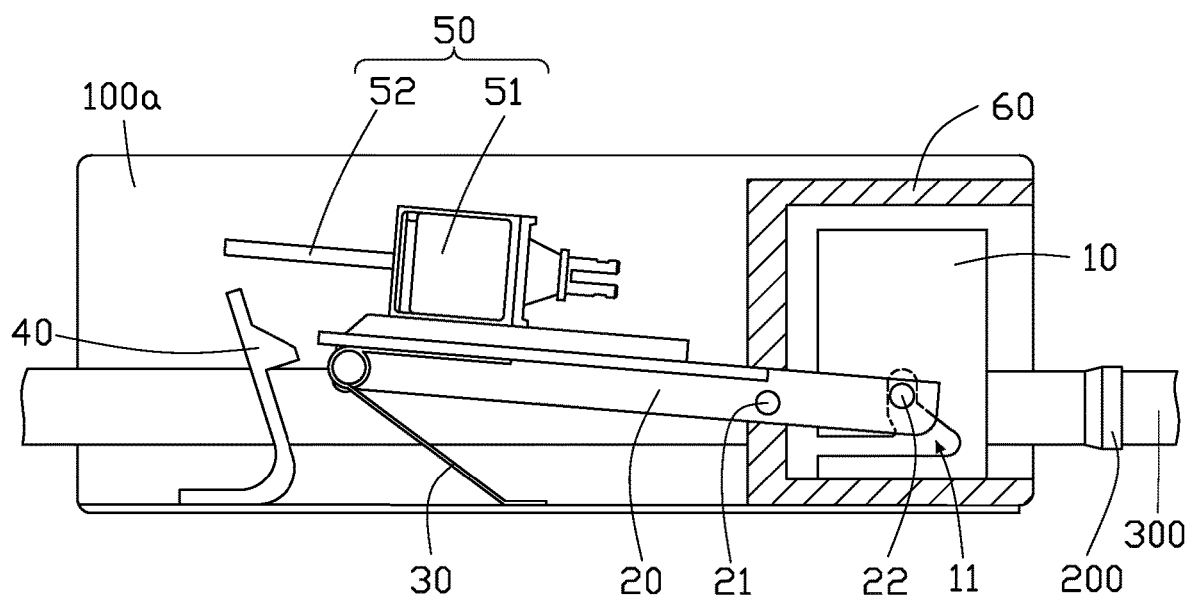
FIG. 2 is a sectional view of the valve in FIG. 1 when the valve is shutting down the flow.
Figure 3:
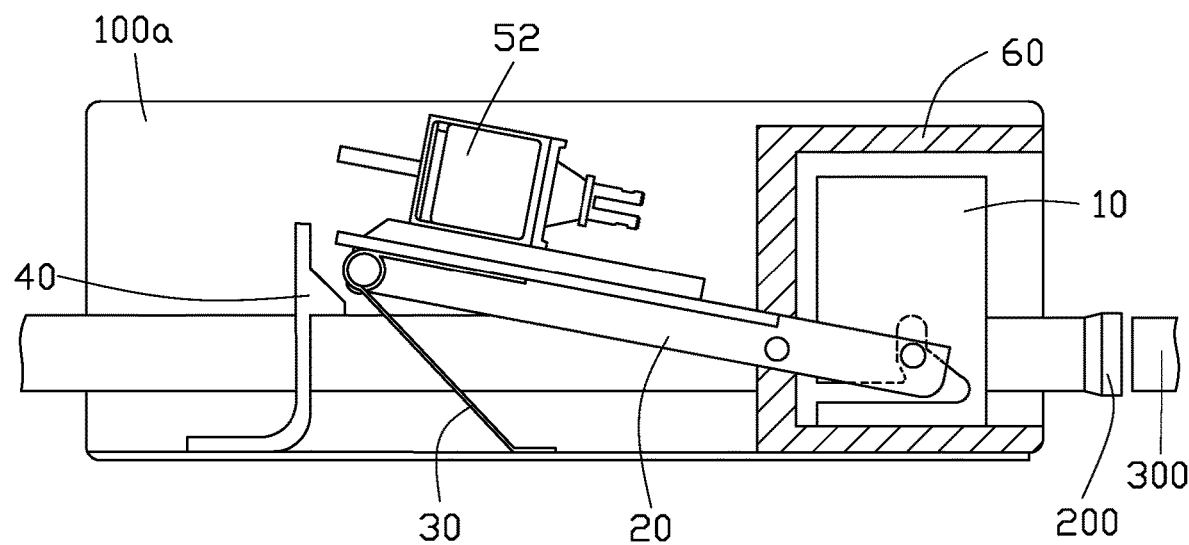
FIG. 3 is a sectional view of the valve of FIG. 1 when the valve is completely closed.

As shown in FIG. 1 to FIG. 3, a valve 100 of an embodiment includes a frame 100a, a tube 200, a moving part 10, a lever 20, an elastic part 30, a buckle 40, and a trigger 50. The tube 200 is movable relative to the frame 100a along a direction X which direction is parallel to the axis of a pipeline connected to the valve 100. The moving part 10 is connected to the tube 200 and is also movable relative to the frame 100a along the direction X. The tube 200 moves with the moving part 10. The lever 20 is rotatable around an axis 21 perpendicular to the direction X and is connected to the moving part 10. The axis 21 is fixed relative to the frame 100a. The elastic part 30 is located on the frame 100a and is connected to the lever 20. The elastic part 30 can push the lever 20 to rotate around the axis 21. The buckle 40 acts as a latching mechanism and is located on the frame 100a. The buckle 40 can lock the lever 20 from rotating but can be unlatched to release the lever 20 and allow rotation. The trigger 50 is located on the lever 20. The trigger 50 can push the buckle 40 away from the lever 20 to unlatch and release the lever 20.

Before the valve 100 shuts off the flow, as shown in FIG. 1, the tube 200 is connected to the pipe 300. In this state, the buckle 40 blocks the lever 20 from rotating, and the elastic part 30 is compressed by the lever 20. The pipeline connected to the valve 100 (pipe 300) is immovable.

When the flow is to be stopped, as shown in FIG. 2 and FIG. 3, the trigger 50 pushes the buckle 40 away from the lever 20 until the buckle 40 unlatches and releases the lever 20. After the buckle 40 releases the lever 20, the elastic part 30 is released and pushes against one end of the lever 20 to rotate the lever 20. During the rotation of the lever 20, the other end of the lever 20 pulls the moving part 10 move along the direction X, and meanwhile, the moving part 10 pulls the tube 200 along the direction X together, until the tube 200 is disconnected from the pipe 300, as shown in FIG. 3.

In some embodiments, the flow is a fluid.

In some embodiments of the lever 20, the distance between the axis 21 and the end connected to the moving part 10 is shorter than the distance between the axis 21 and the end closer to the buckle 40. According to the principle of leverage, the force of the elastic part 30 is thus amplified. The elastic part 30 can be a spring.

In some embodiments, the buckle 40 is located close to the end of the lever 20 away from the end connected to the moving part 10. The buckle 40 can latch the near end of the lever 20 to restrict the lever 20 from rotating.

In some embodiments, the trigger 50 includes a base 51 and a rod 52. The base 51 is located on the lever 20. The rod 52 can extend out of the base 51 to push the buckle 40 away from the lever 20 and can also retract from the buckle 40.

In some embodiments, the trigger 50 is an electric cylinder.

Figure 4:
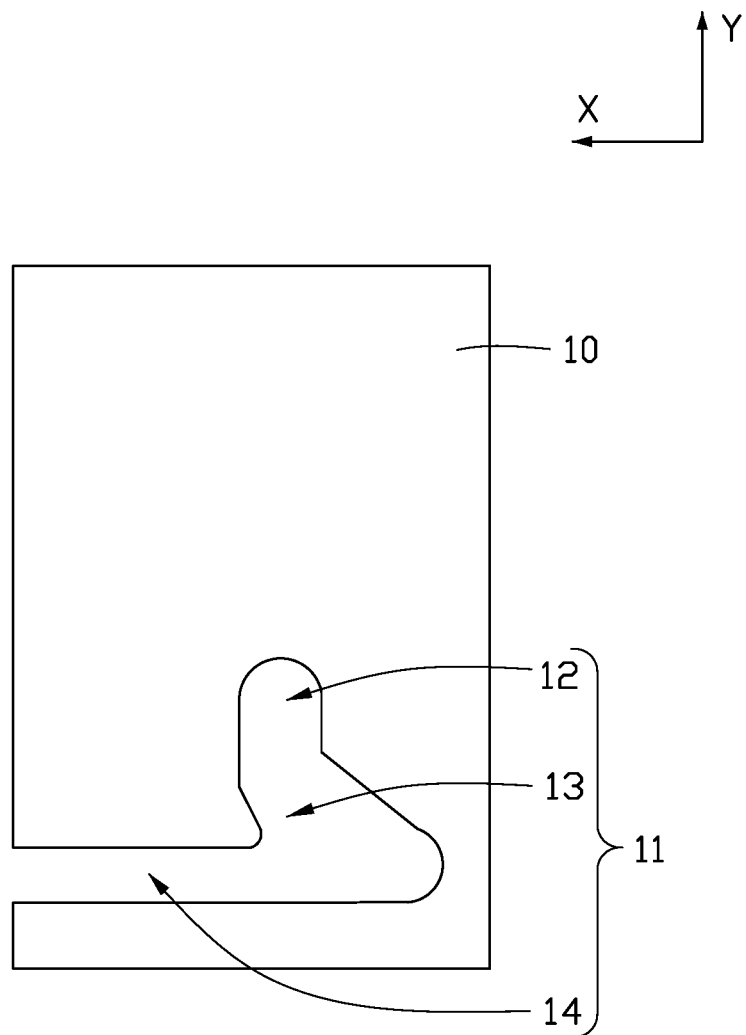
FIG. 4 is a side view of a moving part of the valve in an embodiment of the present disclosure.

In some embodiments, as shown in FIG. 4, the moving part 10 has a groove 11. The groove 11 has a vertical section 12. The vertical section 12 extends along a direction Y. The direction Y is substantially perpendicular to the direction X. The lever 20 has a pin 22 on the end. The pin 22 is inserted into the vertical section 12. The pin 22 is movable along the direction Y in the vertical section 12 relative to the moving part 10. As shown in FIG. 1-3, when the lever 20 rotates clockwise, the pin 22 moves to the left, so the moving part 10 and the tube 200 also move to the left. When the lever 20 rotates counterclockwise, the pin 22 moves to the right, so the moving part 10 and the tube 200 also move to the right.

In some embodiments, the groove 11 has a horizontal section 13. The horizontal section 13 extends along the direction X. One end of the horizontal section 13 connects to the vertical section 12, the other end is open on the moving part 10.

In some embodiments, the groove 11 has an inclined section 14. The inclined section 14 connects between the vertical section 12 and horizontal section 13. The inclined section 14 can extend the total length of the vertical section 12 and horizontal section 13 to limit the pin 22 stay in the vertical section 12.

As shown in FIG. 1, the buckle 40 is L-shaped. The buckle 40 includes a fixed part 41 and a functional part 42. The fixed part 41 is fixed on the frame 100a. The functional part 42 is connected to the fixed part 41. The functional part 42 is used to capture (latch) the lever 20. The connection between the fixed part 41 and the functional part 42 has elasticity. After the trigger 50 pushes the functional part 42 away from the lever 20, the functional part 42 can reset elastically.

In some embodiments, the functional part 42 has a flat surface 43 and a bevel surface 44. The flat surface 43 and the bevel surface 44 face opposite sides. The flat surface 43 is used to latch the lever 20. The lever 20 can slide along the bevel surface 44 to reset. After shutting off the flow, reconnection of the flow requires pressing the lever 20 to slide along the bevel surface 44 until the lever 20 is blocked by the flat surface 43. When the lever 20 slides along the bevel surface 44, the functional part 42 is pushed to the left and reset by elasticity until the lever 20 is again latched under the flat surface 43. During the pressing of the lever 20, the elastic part 30 is also compressed to store energy. The pressing of the lever 20 can be accomplished by automation such as cylinder and so on.

In some embodiments, there are two levers 20 located on either side of the moving part 10. The two levers 20 are connected on the end away from the moving part 10. The two levers 20 rotate together to push the moving part 10 to move, giving more stability.

In some embodiments, as shown in FIG. 1-3, the tube 200 and the pipe 300 both extend along the direction X.

In some embodiments, as shown in FIG. 1, the valve further includes a bracket 60. The bracket 60 is located on the frame 100a. The axis 21 of the lever 20 is located on the bracket 60. The bracket 60 provides ease and convenience in the installation of the valve 100.

A pipeline of an embodiment includes two pipes 300 and a valve 100. Each pipe 300 is connected to an end of the tube 200.

A immersion cooling system of an embodiment includes a tank, a plurality of storage devices and the pipeline mentioned-above. The tank is used for containing water. A plurality of storage devices mounted in the tank and immerged in the water. The pipeline is used for circulating the water and cooling the storage devices. When the valve is shut off, the water flow into the tank.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A valve comprising:
a frame;
a tube movable relative to the frame along a direction X;
a moving part connected to the tube and movable relative to the frame along the direction X;
a lever rotatable around an axis perpendicular to the direction X and connected to the moving part;
an elastic part located on the frame and connected to the lever to push the lever to rotate;
a buckle located on the frame to lock the lever from rotating; and
a trigger located on the lever to push the buckle away from the lever to release the lever, wherein
when the trigger pushes the buckle away from the lever, the buckle releases the lever, the elastic part pushes against one end of the lever to rotate the lever, the other end of the lever pulls the moving part along the direction X, the moving part pulls the tube along the direction X together.

2. The valve of claim 1, wherein:
a distance between the axis of the lever and an end of the lever connected to the moving part is shorter than a distance between the axis of the lever and an end of the lever closer to the buckle.

3. The valve of claim 1, wherein:
the lever has two ends, one end of the lever is connected to the moving part, the buckle is located close to the other end of the lever away from the end connected to the moving part, the buckle is configured to latch the near end of the lever to block the lever from rotating.

4. The valve of claim 1, wherein:
the trigger comprises a base and a rod, the base is located on the lever, the rod is extendable out of the base to push the buckle away from the lever.

5. The valve of claim 4, wherein:
the trigger is an electric cylinder.

6. The valve of claim 1, wherein:
the moving part defines a groove, the groove defines a vertical section, the vertical section extends along a direction Y, the direction Y is substantially perpendicular to the direction X, the lever comprises a pin on the end, the pin is inserted into the vertical section, the pin is movable along the direction Y in the vertical section relative to the moving part.

7. The valve of claim 6, wherein:
the groove further defines a horizontal section, the horizontal section extends along the direction X, one end of the horizontal section connects to the vertical section, the other end is open on the moving part.

8. The valve of claim 7, wherein:
the groove further defines an inclined section, the inclined section connects between the vertical section and horizontal section, the inclined section is extendable to a total length of the vertical section and horizontal section thereby limiting the pin in the vertical section.

9. The valve of claim 1, wherein:
the buckle is L-shaped, and comprises a fixed part and a functional part, the fixed part is fixed on the frame, the functional part is connected to the fixed part, the functional part is configured to capture the lever, a connection between the fixed part and the functional part has elasticity.

10. The valve of claim 9, wherein:
the functional part defines a flat surface and a bevel surface, the flat surface and the bevel surface face opposite sides, the flat surface is configured to latch the lever, the lever is slidable along the bevel surface to reset.

11. The valve of claim 1, further comprising:
two levers located on either side of the moving part, the two levers being connected on the end away from the moving part.

12. The valve of claim 1, wherein:
the tube extends along the direction X.

13. The valve of claim 1, further comprising a bracket, wherein:
the bracket is located on the frame, the axis of the lever is located on the bracket.

14. A pipeline comprising:
a pipe; and
a valve; wherein
the valve comprises:
a frame;
a tube connectable to the pipe and movable relative to the frame along a direction X;
a moving part connected to the tube and movable relative to the frame along the direction X;
a lever rotatable around an axis perpendicular to the direction X and connected to the moving part;
an elastic part located on the frame and connected to the lever to push the lever rotate;
a buckle located on the frame to lock the lever from rotating; and
a trigger located on the lever to push the buckle away from the lever to release the lever;
when the trigger pushes the buckle away from the lever, the buckle releases the lever, the elastic part pushes against one end of the lever to rotate the lever, the other end of the lever pulls the moving part along the direction X, the moving part pulls the tube along the direction X together to disconnect the tube from the pipe.

15. The pipeline of claim 14, wherein:
the lever has two ends, one end of the lever is connected to the moving part, the buckle is located close to the other end of the lever away from the end connected to the moving part, the buckle is configured to latch the near end of the lever to block the lever from rotating.

16. The pipeline of claim 14, wherein:
the trigger comprises a base and a rod, the base is located on the lever, the rod can extend out of the base to push the buckle away from the lever and can retract from the buckle.

17. The pipeline of claim 14, wherein:
the moving part has a groove, the groove has a vertical section, a horizontal section and an inclined section, the vertical section extends along a direction Y, the direction Y is substantially perpendicular to the direction X, the lever has a pin on the end, the pin is inserted into the vertical section, the pin is movable along the direction Y in the vertical section relative to the moving part;
the horizontal section extends along the direction X, one end of the horizontal section connects to the vertical section, the other end is open on the moving part;
the inclined section connects between the vertical section and horizontal section, the inclined section can extend the total length of the vertical section and horizontal section to limit the pin locate in the vertical section.

18. The pipeline of claim 14, wherein:
the buckle is L-shaped, which comprises a fixed part and a functional part, the fixed part is fixed on the frame, the functional part is connected to the fixed part, the functional part is used to capture the lever, the connection between the fixed part and the functional part has elasticity.

19. The pipeline of claim 18, wherein:
the functional part has a flat surface and a bevel surface, the flat surface and the bevel surface face opposite sides, the flat surface can block the lever, the lever can slide along the bevel surface to reset.

20. An immersion cooling system, comprising:
a tank for containing water;
a plurality of storage devices mounted in the tank and immerged in the water; and
a pipeline for circulating the water and cooling the storage devices; wherein
the pipeline comprises:
a pipe; and
a valve; wherein
the valve comprises:
a frame;
a tube connectable to the pipe and movable relative to the frame along a direction X;
a moving part connected to the tube and movable relative to the frame along the direction X;
a lever rotatable around an axis perpendicular to the direction X and connected to the moving part;
an elastic part located on the frame and connected to the lever to push the lever rotate;
a buckle located on the frame to lock the lever from rotating; and
a trigger located on the lever to push the buckle away from the lever to release the lever;
when the trigger pushes the buckle away from the lever, the buckle releases the lever, the elastic part pushes against one end of the lever to rotate the lever, the other end of the lever pulls the moving part along the direction X, the moving part pulls the tube along the direction X together to disconnect the tube from the pipe.

* * * * *